UNITED STATES PATENT OFFICE.

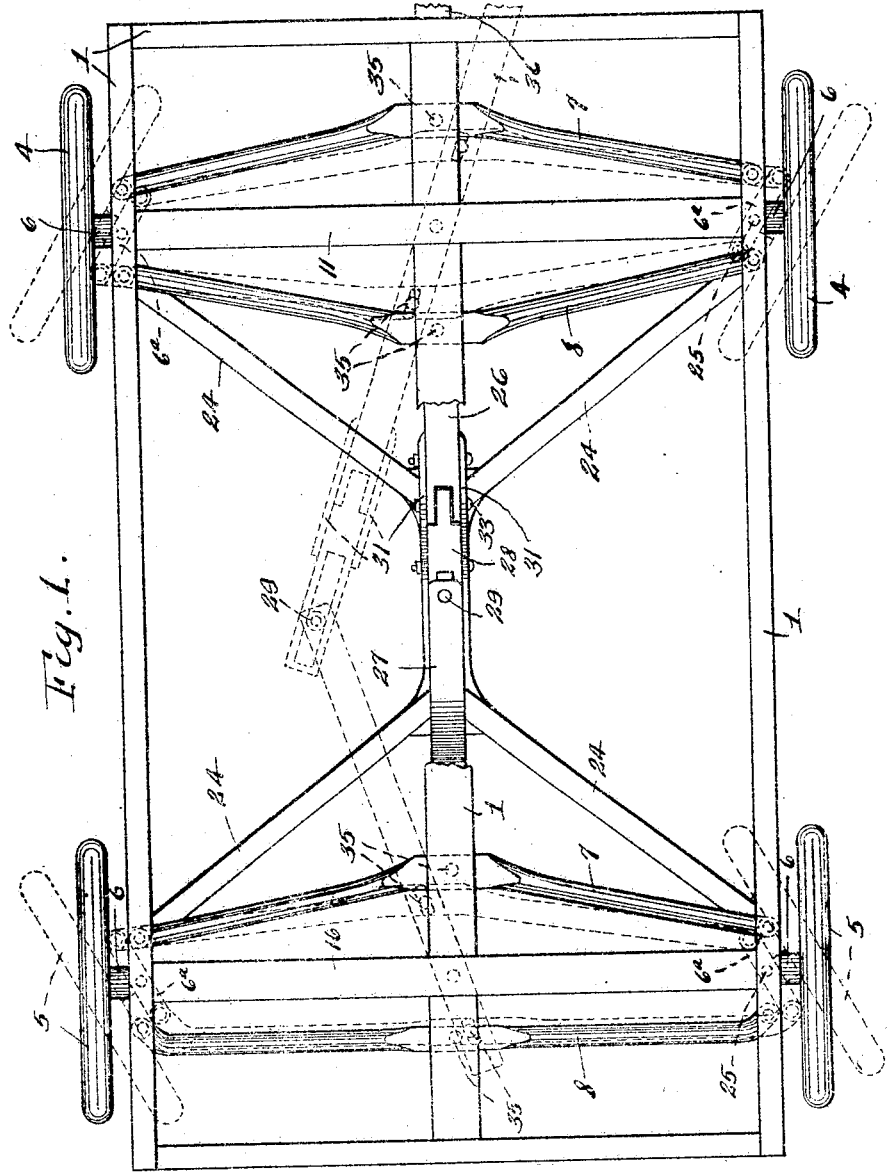

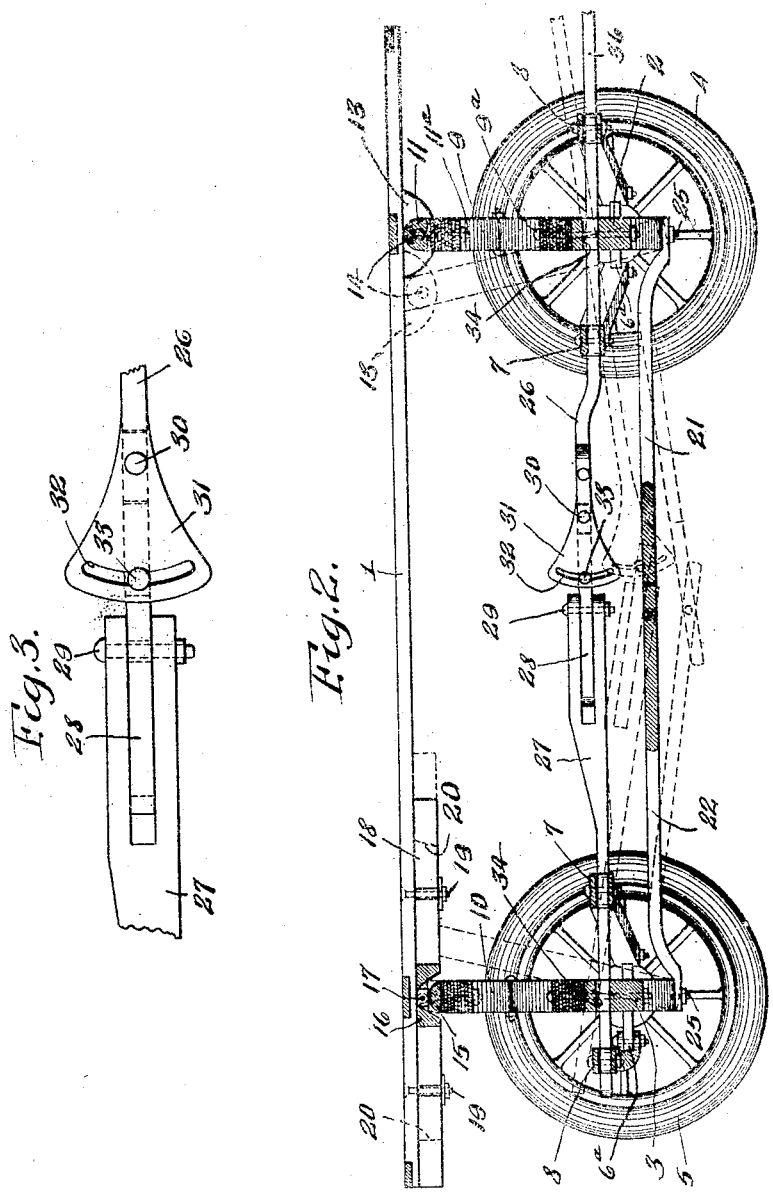

FRANK S. W. MILLER, OF SYRACUSE, NEW YORK.

TRAILER OR WAGON.

1,381,327.   Specification of Letters Patent.   Patented June 14, 1921.

Application filed April 17, 1920. Serial No. 374,529.

*To all whom it may concern:*

Be it known that I, FRANK S. W. MILLER, a citizen of the United States, and a resident of Syracuse, in the county of Onondaga and State of New York, have invented a certain new and useful Trailer or Wagon, of which the following is a specification.

This invention relates to wagons or trailers and has for its object a particularly simple, efficient and durable construction and arrangement of the body and the bolsters, or means connecting the body to the running gear whereby the front and rear wheels can shift relatively to the body and thus relieve the body of road shocks and jars.

The invention consists in the novel features and in the combinations and constructions hereinafter set forth and claimed.

Figure 1 is a plan view of a wagon or trailer embodying my invention, the box being omitted.

Fig. 2 is a longitudinal sectional view centrally on Fig. 1.

Fig. 3 is an enlarged fragmentary plan view of the steering gear interposed between the axles.

This wagon or trailer comprises generally, a frame or body, front and rear axles having means associated therewith on which front and rear wheels are mounted, bolsters mounted on the axles for supporting the body and including upper and lower parts or sections, the lower sections being pivotally or movably connected to the upper to shift forwardly and rearwardly and means between the axles or the bolsters to transfer the pivotal movement of one shiftable bolster section to the other shiftable section.

1 designates the frame or the body which may be of any suitable form, size and construction.

2 and 3 are respectively the front and rear axles, and 4 and 5 the front and rear wheels. In this embodiment of my invention, both the front and rear wheels are mounted to have a steering movement and are connected together so that steering movement of the front wheels is transferred to the rear.

Preferably, the wheels 5 are mounted on the spindles carried by steering knuckles 6 mounted in yokes at the ends of the axles in the usual manner and having arms 6ª thereon which extend forwardly and rearwardly, the arms of each steering knuckle being connected to the steering knuckle on the other side of the vehicle by cross rods 7 and 8 located respectively in front and rear of the axle.

9 and 10 are respectively the front and rear bolsters, the front bolster comprising an elliptical spring mounted on the axle centrally thereof at 9ª and extending transversely of the body and lengthwise of the bar 11 connected at 11ª to the central part of the spring and an upper bolster section 13 secured to the frame 1, the bar 11 being pivoted at its ends at 14 to the section 13 on an axis extending transversely of the body and lengthwise of the bar.

The rear bolster includes a similar spring and cross bar designated 15 and 16, the spring being pivotally connected at 17 to the cross bar 16 and the cross bar 16 being connected to a slide 18 movable forwardly and rearwardly of the body. As here shown, this slide 18 is located centrally of the frame or body and is connected thereto by bolts 19 extending through lengthwise slots 20 in the slide.

The means connecting the front and rear axles or the bolsters to transfer the pivotal movement of the front lower bolster section to the rear lower bolster section as here shown, comprises a reach including front and rear sections 21 and 22 which are pivoted together midway between the front and rear axles by a horizontal transverse pivot. Each section of the reach also includes diverging arms 24 which are connected to the axles at 25 near the ends of the axles.

The means for transferring the steering movement of the front wheels to the rear wheels comprises front and rear sections 26, 27 and an intermediate section 28 pivoted to the rear section on a vertical pivot 29 and to the front section on a horizontal axis at 30.

Braces 31 are provided at the rear end of the front section 27 and embrace the intermediate member 28, these braces being formed with arc shaped slots 32 concentric with the axis 30 through which slots fastening members 33 are passed into the intermediate section 28.

The sections 26, 27 extend through passages 34 in the axles and are pivoted at 35 to the cross steering rods 7, 8 and the front section extends forwardly at 36 to provide a draw bar for connection to a tractor.

In operation, as the wagon or trailer is traveling over the ground and the front or rear wheels strike obstructions, say for instance, the front wheel or wheels, the pivoted section 9 of the front bolster moves rearwardly about its pivot 14 and the motion is transferred through the reach to the lower pivoted section of the rear bolster 10 and excessive movements are transferred to the slide 17 thus relieving the body of shocks. The pull on the draw bar 36 transferred through the axles and the reach tends to hold the rear wheels forwardly with respect to their pivotal and sliding movements and hence, when the rear wheels strike obstructions practically the same action takes place as when the front wheel strikes an obstruction.

What I claim is:

1. In a wagon, the combination of a body, a running gear comprising front and rear axles having means associated therewith on which the wheels are mounted, bolsters interposed between the axles and the body including upper and lower sections, the lower section of each bolster being pivotally connected to the upper section on an axis extending transversely of the body, and a reach connecting the axles, the reach including sections connected respectively to the axles, the sections being pivotally connected together on a horizontal transverse axis, substantially as and for the purpose described.

2. In a wagon, the combination of a body, a running gear comprising front and rear axles having means associated therewith on which the wheels are mounted, bolsters interposed between the axles and the body and including upper and lower sections, the upper section of one bolster being fixed to the body and the upper section of the other bolster being connected to the body to slide forwardly and rearwardly, the lower sections of the bolsters being pivoted to the upper sections on axes extending transversely of the body, and a reach connecting the axles, substantially as and for the purpose set forth.

3. In a wagon, the combination of a body, a running gear comprising front and rear axles, steering knuckles carried by the axles and having spindles, wheels mounted on the spindles, a cross steering rod connecting the steering knuckles of each axle, bolsters interposed between the axles and the body and including upper and lower sections, the lower section of each bolster being pivoted on a transverse axis to the upper section to shift forwardly and rearwardly, a reach connecting the axles to transfer the pivotal movement of the lower front bolster section to the lower rear bolster section, and steering gears connecting the front and rear wheels, the reach and the steering gear each comprising front and rear sections pivoted together on a transverse axis, substantially as and for the purpose described.

4. In a wagon, the combination of a body, running gear comprising front and rear axles, steering knuckles carried by the axles and having spindles, wheels mounted on the spindles, a cross steering rod connecting the steering knuckles of each axle, bolsters interposed between the axles and the body and including upper and lower sections, the lower section of each bolster being pivoted on a transverse axis to the upper section to shift forwardly and rearwardly, and the upper section of the rear bolster being slidably connected to the body to slide forwardly and rearwardly, a reach connecting the axles to transfer the pivotal movement of the lower front bolster section to the lower rear bolster section, and steering gears connecting the front and rear wheels, the reach and the steering gear each comprising front and rear sections pivoted together on a transverse axis, substantially as and for the purpose set forth.

In testimony whereof, I have hereunto signed my name at Syracuse, in the county of Onondaga, and State of New York, this 7 day of April, 1920.

FRANK S. W. MILLER.